United States Patent [19]
Davis

[11] 3,759,581
[45] Sept. 18, 1973

[54] BRAKING SYSTEMS

[75] Inventor: John Walter Davis, Warwickshire, England

[73] Assignee: Dunlop Holdings Limited, Fort Erdingham, Birmingham, England

[22] Filed: Aug. 3, 1971

[21] Appl. No.: 168,617

[30] Foreign Application Priority Data
Aug. 6, 1970 Great Britain.................. 37,909/70

[52] U.S. Cl.............................. 303/13, 303/21 F
[51] Int. Cl............................................. B60t 8/12
[58] Field of Search .................. 303/21 F, 21 AF, 303/61-63, 68-69, 2, 13; 188/181

[56] References Cited
UNITED STATES PATENTS
3,536,362  10/1970  Davis.............................. 303/21 F
3,633,978  1/1972  Remillieux........................ 303/21 F Primary Examiner—Duane A. Reger
Attorney—John A. Young

[57] ABSTRACT

A vehicle dual braking system in which a service braking function brake-applying line including a service braking function brake actuator and a secondary braking function brake-applying line including a secondary braking function brake actuator are both controlled by a skid-control valve operated by a skid-detecting device associated with a wheel of the vehicle. The skid detecting device is arranged to detect any tendency of the wheel to lock under braking and to operate the skid control valve to release the operative brake actuator whenever any such tendency is detected and to re-apply the previously operative actuator when the tendency for the wheel to lock has been overcome, of which the following is a specification.

20 Claims, 5 Drawing Figures

BRAKING SYSTEMS

This invention relates to dual braking systems, that is braking systems which incorporate a service and secondary braking function, and is particularly concerned with pneumatically operated dual braking systems for commercial vehicles and with brake actuators for use in such systems.

The invention has as one of its objects the provision of an improved dual braking system.

According to one aspect of the present invention a vehicle dual braking system comprises a service braking function brake-applying line comprising a service braking function brake actuator and a secondary braking function brake-applying line comprising a secondary braking function brake actuator, both the service and secondary braking function brake-applying lines being controlled by a skid-control valve operated by a skid-detecting device associated with a wheel of the vehicle, the skid-detecting device being arranged to detect any tendency of the wheel to lock under braking and to operate the skid-control valve to release the operative brake actuator whenever any such tendency is detected, the skid-detecting device also being arranged to operate the skid-control valve to re-apply the previously operative brake actuator when the tendency for the wheel to lock has been overcome.

The present invention also provides a combined service and secondary braking function brake actuator for use in a vehicle dual braking system as defined in the preceding paragraph, the actuator comprises a housing containing a first working chamber for connection to a source of fluid pressure or vacuum to produce a service braking function thrust to apply an associated brake, actuating means to generate a secondary braking function thrust to apply an associated brake, and a second working chamber for connection to a source of fluid pressure or vacuum to produce a thrust in opposition to the thrust of the service or secondary braking function to effect a reduction in the resultant thrust applied to the associated brake as a result of the operation of the service or secondary braking function.

Several embodiments of the present invention will now be described by way of example with reference to the accompanying drawings of which:

Figure 1:
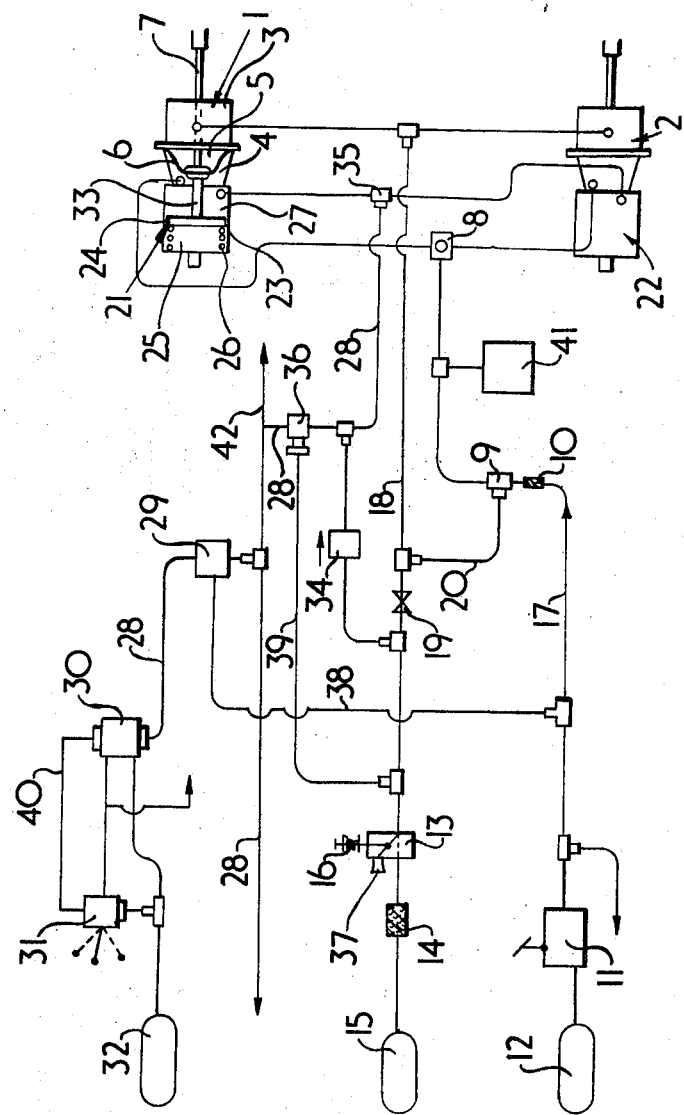
FIG. 1 is a schematic view of a dual braking system in accordance with the present invention.

A pneumatically operated dual braking system in accordance with the present invention for the tractor portion of an articulated vehicle is shown in FIG. 1 of the accompanying drawings.

The service braking function of this system, that is the portion of the system normally employed to brake the vehicle, incorporates a rear wheel anti-skid line and is generally similar to the system disclosed in our British Pat. No. 1,151,223 corresponding to U.S. Pat. No. 3,411,835.

Each rear wheel service braking function actuator 1,2 comprises a housing 3 containing first and second working chambers 4 and 5 separated by a displaceable pressure-sensitive diaphragm 6 having a brake operating rod 7 attached to its centre. The first working chamber 4 of each rear wheel service braking function actuator is connected, via a service braking function brake-applying line 17 incorporating a combined balanced exhaust and non-return valve 8, sensitivity control valve 9, filter 10 and driver's control valve 11, to a service reservoir 12 which is maintained at a predetermined pressure by a compressor (not shown). The second working chamber 5 of each rear wheel service braking function actuator is connected, via an anti-skid line 18 incorporating a skid control valve 13 and filter 14, to an anti-skid reservoir 15 which is charged to a predetermined level by the compressor, the anti-skid reservoir being arranged to provide a skid-correcting pressure to the second chamber 5 to oppose the pressure in the first chamber 4 and thus to reduce the resultant thrust applied to the associated brake when a skid is imminent.

The service braking function brake operating actuators of the front wheels, which are also controlled by the driver's control valve 11, are conventional air chambers and are not connected to the anti-skid line.

The anti-skid line 18 is provided, at a position intermediate the rear wheel actuator second chambers 5 and the skid-control valve 13, with a restrictor 19. This restrictor may be varied to enable the rate of flow of air from the anti-skid reservoir to the second working chambers to be adjusted or tuned to compensate for the different lengths of piping, and consequently different system volumes, used when installing the system on different vehicles. The level of pressure in the anti-skid line 18, between the skid control valve and the second working chambers, is communicated to the sensitivity control valve 9 through connecting line 20.

The skid control valve 13 normally connects the second working chamber 5 of each rear wheel service braking function actuator to atmosphere, via exhaust port 37, but is arranged, in response to a command from a skid-detecting device or system (not shown), to connect the second chamber 5 of each rear wheel service braking function actuator to the anti-skid reservoir 15 to effect release of the rear wheel brakes. The skid detecting device or system may be of any suitable kind, for example the electrical or inductive transducer devices and systems disclosed in our co-pending British Pat. application No. 2,790/66 corresponding to U.S. Pat. No. 3,469,662. When employing a detecting device or system of the kind described above the skid control valve is normally solenoid actuated (see detail 16). The skid control valve may also be actuated mechanically and used in conjunction with any suitable mechanical skid detecting device, for example the flywheel over-run kind of skid detector.

Suitable sensitivity control valve and combined balanced exhaust and non-return valve constructions are disclosed in our British Pat. No. 1,190,573 corresponding to U.S. Pat. No. 3,467,442 and our co-pending British Pat. application No. 44,610/67 corresponding to U.S. Pat. No. 3,575,473 respectively and will not therefore be described in detail.

The sensitivity control valve basically comprises inlet and outlets ports and a pressure responsive restrictor member displaceable between the inlet and outlet ports to restrict the flow of fluid therebetween when the anti-skid circuit is in operation to check a skid. The restrictor member of the sensitivity control valve is arranged to move to its position of maximum flow restriction in response to a rise in pressure in the anti-skid circuit which is communicated to the sensitivity control valve through connecting line 20 as described previously.

The combined balanced exhaust and non-return valve basically comprises inlet, outlet and exhaust ports and a diaphragm or other pressure responsive means arranged to close either the outlet or exhaust ports depending on the relative pressure levels on the inlet and outlet sides of the valve.

The tractor service braking function operates as follows. During normal braking the flow of air to the first working chambers 4 of the rear wheel service braking function actuators and to the conventional front wheel air chambers is controlled by the driver's control valve 11. When the skid detecting device or system senses a skid the skid control valve 13 is actuated to connect the anti-skid reservoir 15 to the second working chambers 5 of the rear wheel service braking function actuators and also to the sensitivity control valve through connecting line 20 to displace the sensitivity control valve restrictor member to its position of maximum restriction. By activating the sensitivity control valve the pressure level in the portion of the service braking function brake-applying line 17 between the sensitivity control valve and the balanced exhaust and non-return valve 8 is prevented from rising to any great extent above the level of pressure which was present in this portion of the service braking function line when the skid occurred despite the fact that the pressure generated by the driver's control valve 11 may continue to rise to a considerably higher level.

The supply of fluid to chambers 5 causes the diaphragms 6 to be deflected to reduce the volumes of the associated first working chambers 4, thus increasing the pressure in chambers 4. This tendency for the pressure in chambers 4 to rise is counteracted by venting air through the balanced exhaust and non-return valve 8.

The balanced exhaust and non-return valve 8 is arranged to disconnect the flow of fluid from the sensitivity control valve to chambers 4 when the pressure in chambers 4 exceeds that in the service braking function line between the exhaust valve and the sensitivity control valve and also simultaneously to vent the excess pressure in chambers 4 to atmosphere.

The pressure in chambers 5 continues to rise until it reaches a value at which the net force transmitted to the operating rod 7 by the pressures in chambers 4 and 5 has been reduced sufficiently to release the brake and relieve the skid. When the tendency of the vehicle to skid has ceased the brakes are re-applied by releasing the pressure in chambers 5 and anti-skid line 18 to atmosphere through an exhaust port 37 of the skid control valve 13.

Throughout the build-up of pressure in chambers 5 the slight influx of air, via the sensitivity control valve, into the portion of the service braking function line between the sensitivity control valve and the balanced exhaust and non-return valve allows the level of pressure in this portion of the service braking function line to increase slightly above the level of pressure present in this portion of this line when the skid occurred. Thus this portion of the service braking function line acts as a reservoir so that when the brakes are re-applied the rate at which air is supplied to chamber 4 can be adjusted, by careful choice of the volume of the system between the balanced exhaust and non-return valve and the sensitivity control valve and the dimensions of the sensitivity control valve restrictor member, to be just sufficient to maintain the level of pressure in chamber 4 during the increase in volume which occurs during brake re-application. An extra volume tank 41 may be provided to adjust the volume of the system as described above.

In addition to the service braking function described above the dual braking system shown in the accompanying drawings also includes a secondary or emergency braking function comprising a pair of rear wheel secondary braking function brake actuators connected to the service and anti-skid lines in a manner to be described and which are arranged to brake the vehicle in the event of the failure of the service braking function.

Each secondary braking function brake actuator 21,22 comprises a housing 23 in which a piston 24, or other similar pressure responsive device such as a diaphragm, is located. The piston divides the interior of the secondary braking function brake actuator housing into two chambers a first secondary braking function brake-applying chamber 25 in which a coiled compression spring 26 is located and a secondary braking function brake-applying chamber 27 on the other side of the piston arranged to be connected, via the secondary braking function brake-applying line 28, which incorporates a differential protection valve 29, inverter valve 30 and secondary braking function hand control valve 31, to a secondary braking function reservoir 32. The piston is connected to a secondary braking function brake-operating rod 33 which is arranged to actuate the brakes entirely independently of the service braking function brake actuator.

The secondary braking function brake actuators 21, 22 may be joined onto the service braking function brake actuators 1 and 2, as shown in FIG. 1, to form a combined service and secondary braking function brake actuator or alternative to actuators for the two braking functions may be contained in a common housing or may be entirely separate units.

The secondary braking function brake-applying line is such that the second chamber 27 of each secondary braking function actuator is normally pressurised by the secondary braking function reservoir 32 so compressing springs 26 and holding the secondary braking function actuators in the "off" position. The secondary braking function brake-applying line is brought into operation, in a manner to be described, by exhausting chambers 27 whereupon springs 26 displace operating rods 33 to actuate the brakes. Thus the secondary braking function brake-applying line is of the "fail-safe" kind in which failure of the pressure in chamber 27 results in the application of the brakes.

A connecting line 42 may be provided if it is desired to utilise similar secondary braking function actuators on the articulated vehicle trailer portion.

The rear wheel secondary braking function actuators 21,22 are connected to the anti-skid line 18 through a non-return valve 34. The non-return valve is arranged to allow the flow of fluid from the anti-skid line 18 to the secondary chambers 27 when the anti-skid line is in operation to check a tendency to skid but does not allow the flow of fluid in the reverse direction at any time.

The portion of the rear wheel secondary line between the second chambers 27 and the differential protection valve 29 incorporates a quick exhaust valve 35 and a shut-off valve 36.

The differential protection valve 29, which is also connected to the service braking function brake-applying line 17 between the driver's control valve 11 and filter 10 through connecting line 38, is arranged to protect the dual braking system against damaging overloading which could result from simultaneous actuation of service and secondary actuators. Should the driver actuate control valves 11 and 31 simultaneously the differential protection valve is arranged to feed the service braking function air pressure into secondary braking function brake-applying line 28 to increase the pressure in second chambers 27 and so either take off, or maintain inoperative, the secondary braking function.

The inverter valve 30, secondary braking function hand control valve 31 and secondary braking function reservoir 32 are interconnected so that when the valve 31 is moved to the "on" position the rise in pressure in the secondary braking function brake-applying line between the valves 31 and 30 is proportionate to the position of the hand control valve 31. The inverter valve 30 is arranged to give a fall in the level of pressure in the secondary braking function brake-applying line 28 on the actuator side of the inverter valve proportional to the increase in pressure in the portion of the secondary braking function brake-applying line between valves 30 and 31.

The shut-off valve 36 is similar in construction to the sensitivity control valve 9 with the exception that when activated the shut-off valve completely cuts off flow between the differential protection valve and the second chambers of the secondary braking function actuators. The level of pressure in the anti-skid line 18 is communicated to the shut-off valve through a connecting line 39 to actuate the shut-off valve in a similar manner to the sensitivity control valve 9. The shut-off valve is arranged to close, thereby preventing a further reduction in the pressure in secondary braking function brake-applying line 28, when the anti-skid line is in operation to check a tendency to skid.

The quick exhaust valve 35 is provided to enable rapid brake application to be achieved by the secondary braking function.

The secondary braking function actuators function as follows. To bring the secondary braking function actuators into operation the driver moves the hand control valve 31 from the "off" position to select the appropriate braking effort required. The hand control valve 31 and inverter valve 30 produce a fall in the level of pressure in the secondary braking function brake-applying line 28 on the actuator side of valve 30 which is relayed by the quick exhaust valve 35 to the second chambers 27, thus operating the secondary braking function actuators.

Should the secondary braking function effort selected by the driver be too great for the prevailing road surface conditions a skid will be initiated which will be sensed by the skid detecting device or system which in turn actuates the skid-control valve 13.

This causes pressurisation of chambers 5 to counter skidding in the same way as described for the service braking function. It also causes the shut-off valve 36 to operates to stop further fall of pressure in second chambers 27.

If the incipient skid is corrected before the anti-skid pressure in line 18 has risen above the level trapped in line 28 on the actuator side of valve 36 no air passes through non-return valve 34 and skid correction is effected in exactly the same way as for the service braking function, except that the pressure in chambers 5 counters the difference between the force of the springs 26 and the reduced air pressure force acting upon pistons 24.

If however, as on a slippery road surface, it is necessary for the anti-skid pressure to rise in line 18 above the level of pressure trapped in line 28 by valve 36, then air flows through the non-return valve 34 and the resultant pressure rise in chambers 27 acts upon the pistons 24 to provide further assistance to the counter pressures in chambers 5.

The secondary braking function brake-applying line described above is also arranged to apply the associated vehicle brakes for the purpose of parking.

With the secondary braking function control valve in the fully "on" position the secondary actuators can be used to park the vehicle. However, this requires the maintenance of a positive pressure in the secondary braking function brake-applying line between the valves 30 and 31 as described previously. This is obviously an undesirable requirement as on the majority of occasions when the vehicle is parked, the vehicle engine, and thus the reservoir compressor, is not in operation. In order to overcome this difficulty an additional connection or parking line 40 is provided between valves 30 and 31 and the hand control valve 31 is provided with a "park" position. With valve 31 in the "park" position the park line 40 is arranged to be at atmospheric pressure and the inverter valve 30 is arranged to respond to this level of pressure in line 40 in exactly the same manner as it responds to the pressure present in the secondary braking function brake-applying line between valves 30 and 31 with the control valve 31 in the fully "on" position.

Figure 2:
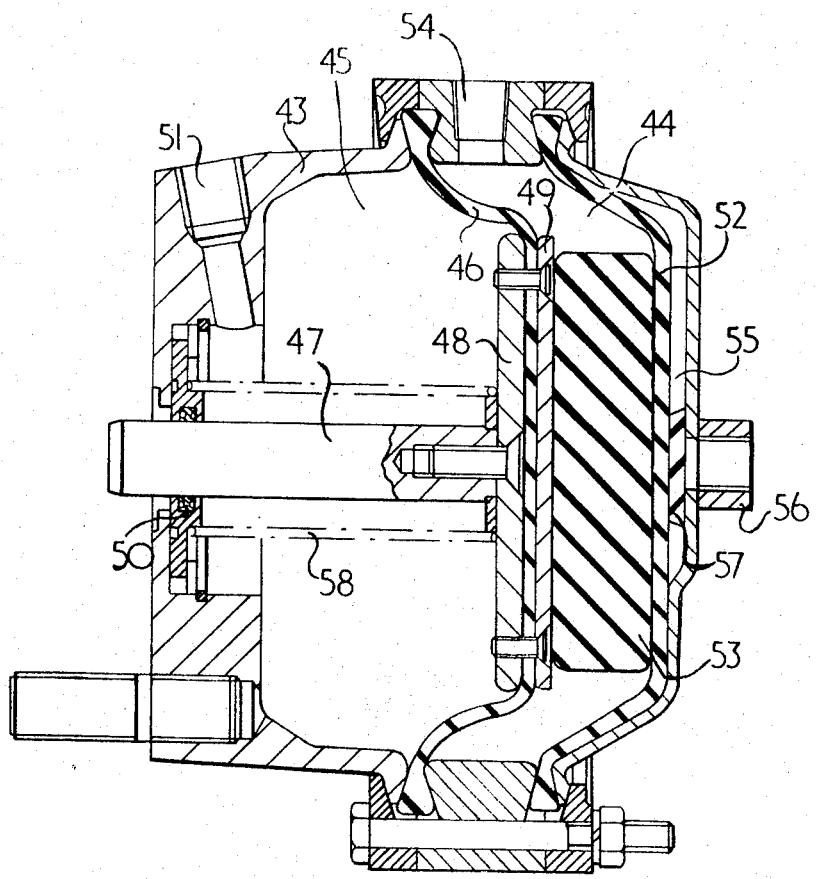
FIG. 2 is a cross-sectional view of a double diaphragm actuator in accordance with the present invention.
Figure 3:
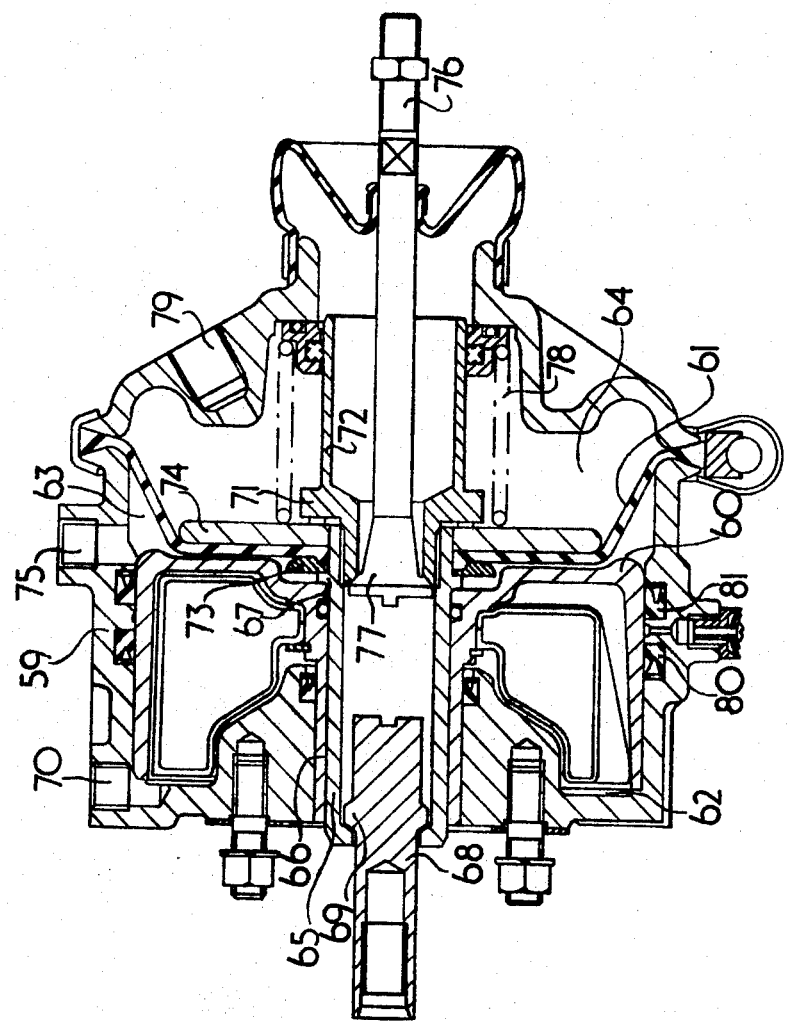
FIG. 3 is a cross-sectional view of a piston and diaphragm actuator in accordance with the present invention.
Figure 4:
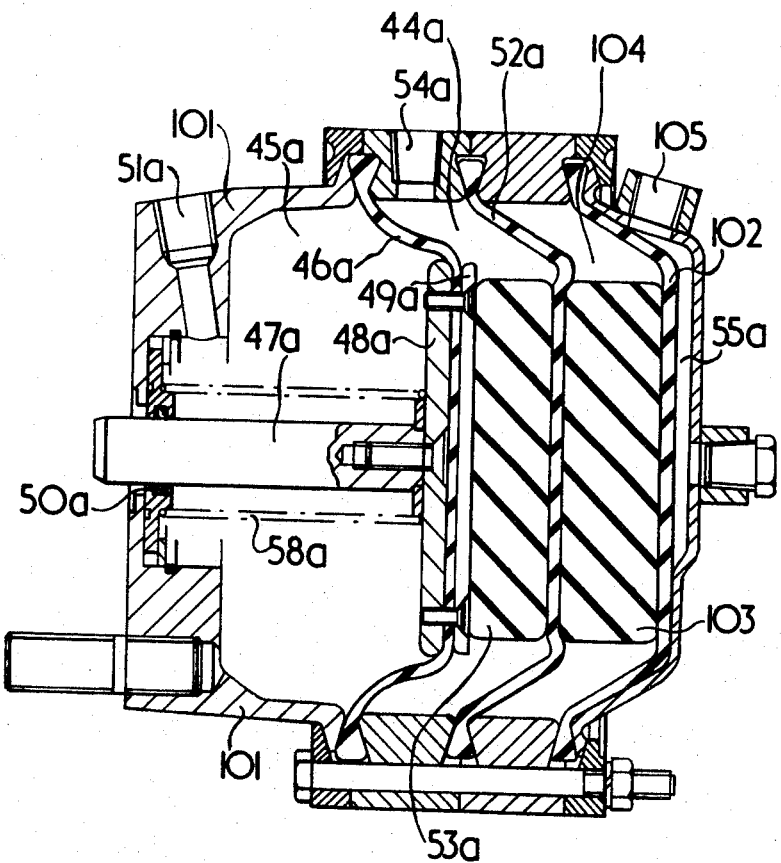
FIG. 4 is a cross-sectional view of a triple diaphragm actuator in accordance with the present invention.

A further three forms of combined service and secondary braking function brake actuators in accordance with the present invention are shown in FIGS. 2, 3 and 4 of the accompanying drawings.

The combined actuator shown in FIG. 2 comprises a housing 43 divided into three separate fluid pressure containing chambers by two axially aligned and spaced displaceable pressure responsive diaphragms clamped at their outer peripheries to housing 43. First pressure responsive diaphragm 46 forms in conjunction with housing 43 second working chamber 44, while second pressure responsive diaphragm 52 defines first working chamber 44 in conjunction with diaphragm 46 and housing 43 and forms secondary braking function brake-applying chamber 55 in conjunction with housing 43.

A brake operating rod 47 supported on a metal plate 48 is secured to the central region of diaphragm 46 by clamping the central region of the diaphragm between plate 48 and a further plate 49. Operating rod 47 extends through second working chamber 45 and out through housing 43 through a seal 50. Second working chamber 45 is provided with a port 51 for connection to an anti-skid line in a manner to be described.

Second diaphragm 52 is provided with an integrally formed or bonded block 53 of rubber or other suitable material on the side thereof facing first diaphragm 46. The dimensions of block 53 are arranged to be such that this block abuts plate 49 which is attached to first diaphragm 46 thereby ensuring that movements of diaphragm 46 to the right, as seen in FIG. 2, result in corresponding movements to the right of diaphragm 52. First working chamber 44 is provided with a port 54 for connection to a service braking function brake-applying line in a manner to be described.

Secondary braking function brake-applying chamber 55 is provided with a port 56 for connection to a secondary braking function brake-applying line in a manner to be described. Port 56 is positioned in alignment with brake-applying rod 47 and a seal 57 is provided on the central region of diaphragm 52 to co-operate with port 56 so that in the event of the failure of diaphragm 52 during service operation of the combined actuator the movement to the right of diaphragm 52, viewing the actuator as seen in FIG. 2, which will still occur despite the failure of diaphragm 52, will result in the sealing of port 56 by seal 57 thus preventing the loss of the service braking function. Alternatively the seal can be bonded to the housing around port 56 in which case diaphragm 52 will seal port 56 by making contact with seal 57 in the event of the failure of diaphragm 52.

A return spring 58, acting between plate 49 and housing 43, biases the combined actuator to the brake-releasing position shown in FIG. 2.

As will be appreciated from the above description, by connecting first working chamber 44 of the actuator shown in FIG. 2 to a source of pneumatic pressure diaphragm 52 is forced to the right, as seen in FIG. 2, and diaphragm 46 is forced to the left thereby moving rod 47 to the left and applying the associated brake. The connection of secondary braking function brake-applying chamber 55 to a source of pneumatic pressure forces diaphragm 52 and hence rod 47 to the right, as seen in FIG. 2, thereby applying the associated brake. Connection of second working chamber 45 to a source of pneumatic pressure forces diaphragm 46 to the right, as seen in FIG. 2, thereby moving rod 47 to the right and hence reducing or completely releasing the braking force exerted by the associated brake as a result of fluid pressure in chamber 44 or 55.

The combined actuator shown in FIG. 3 comprises a housing 59 divided into three separate fluid pressure containing chambers by a piston 60 and a displaceable pressure responsive diaphragm 61.

Piston 60 forms, in conjunction with housing 59, first working chamber 62 while diaphragm 61 forms secondary braking function brake-applying chamber 63 in conjunction with piston 60 and housing 59 and forms second working chamber 64 in conjunction with housing 59.

Piston 60, which is in sealed sliding contact at its outer periphery with housing 59, carries a hollow sleeve 65 in sealed sliding contact with a bore 66 extending axially through the centre of the piston. Sleeve 65 is provided with a flange 67 which abuts piston 60 so that movement of piston 60 to the right as seen in FIG. 3 results in a corresponding movement of sleeve 65 to the right. Sleeve 65 also carries extending down its hollow centre a brake operating rod 68 which, by virtue of a flange 69 carried by rod 68, is arranged to be drawn to the right when sleeve 65 moves to the right.

First working chamber 62 is provided with a port 70 for connection to a service braking function brake-applying line in a manner to be described.

Diaphragm 61 is secured to sleeve 65 by being clamped between flange 67 and a flange 71 formed on a second hollow sleeve 72 which is screw-threaded into the end of sleeve 65 adjacent diaphragm 61. Diaphragm 61 is supported between flanges 67 and 71 by a washer 73 on the side of the diaphragm adjacent flange 67 and by an annular metal plate 74 on the side adjacent flange 71. Secondary braking function brake-applying chamber 63 is provided with a port 75 for connection to a secondary braking function brake-applying line in a manner to be described.

Hollow sleeve 72 carries down its hollow centre a hand brake operating rod 76 provided with a head portion 77 which abuts against sleeve 72 so that movement of rod 76 to the right as seen in FIG. 3 results in movement of sleeve 72 and hence sleeve 65 to the right. The end of sleeve 72 remote from diaphragm 61 is supported in sealed sliding contact with housing 59.

A return spring 78, acting between plate 74 and housing 59, biases the combined actuator to the brake releasing position shown in FIG. 3.

Second working chamber 64 is provided with a port 79 for connection to an anti-skid line in a manner to be described.

Piston 60 is provided with two seals 80 and 81 to seal its sliding contact with housing 59. The provision of two seals in the combined actuator shown in FIG. 3 is a safety measure equivalent to the use of seal 57 in the combined actuator shown in FIG. 2, as in the event of the failure of either seal 80 or 81 one of chambers 62 and 63 still remains operative, dependent on which of the seals 80 or 81 has failed.

As will be appreciated from the above description by connecting first working chamber 62 to a source of pneumatic pressure piston 60 is forced to the right, as seen in FIG. 3, thereby drawing rod 68 to the right and applying the associated brake. Connecting secondary braking function brake-applying chamber 63 to a source of pneumatic pressure forces piston 60 to the left and diaphragm 61 to the right thereby drawing rod 68 to the right and applying the associated brake. Connection of second working chamber 64 to a source of pneumatic pressure forces diaphragm 61 to the left thereby releasing rod 68 and allowing the reduction or complete removal of the braking force exerted on the associated brake as a result of the fluid pressure in chambers 62 or 64.

The actuator shown in FIG. 3 has built in assistance for the application of the associated brake for the purpose of parking. Application of the brake for the purpose of parking can be accomplished manually by drawing rod 76 to the right as seen in FIG. 3 whereupon sleeve 65 and brake operating rod 68 are also drawn to the right thereby applying the associated brake. However, by supplying pneumatic pressure to secondary braking function brake-applying chamber 63 sleeves 65 and 72 and brake operating rod 68 can be drawn to the right thereby applying the associated brake, whereupon rod 76 can then be drawn to the right by operation of a conventional parking brake lever to hold the brake on, using a conventional ratchet mechanism, without the need to exert the physical effort required to manually draw rod 68 to the right to apply the brake. The application of pneumatic pressure to chamber 63 for parking braking can conveniently be arranged to be initiated by the initial movement of the parking brake lever and may be proportional to hand effort or alternatively can be initiated by normal application of the secondary braking function with the vehicle stationary.

A further form of combined actuator in accordance with the present invention is shown in FIG. 4 of the accompanying drawings.

This actuator incorporates a considerable number of the components of the actuator shown in FIG. 2. These components have therefore been similarly numbered to the components appearing in FIG. 2 with the suffix *a* added and their construction and operation will not therefore be described again.

The housing 101 of the actuator shown in FIG. 4 is an elongated form of the housing 43 shown in FIG. 2. The actuator shown in FIG. 4 is provided with an additional diaphragm 102 provided with a block 103, similar to block 53a, arranged to abut diaphragm 52a. Diaphragm 102 thus forms in conjunction with housing 101 and diaphragm 52a an additional chamber 104 which is permanently connected to atmosphere. Diaphragm 102 also forms in conjunction with housing 101 a secondary braking function brake-applying chamber 55a corresponding to the chamber 55 of the actuator shown in FIG. 2. Secondary braking function brake-applying chamber 55a is provided with a port 105 for connection to a source of pneumatic pressure in the same manner as port 56 of the actuator shown in FIG. 2.

The first and second working chambers and secondary braking function brake-applying chambers of the actuator shown in FIG. 4 fulfil the same function and are connected to the appropriate reservoirs in a similar manner to the actuator shown in FIG. 2. The provision of extra diaphragm 102 ensures that should diaphragm 52a fail, resulting in an escape of air pressure via additional chamber 104, the secondary braking function is reained intact and the vehicle can be brought safely to rest. Thus additional diaphragm 102 replaces the seal 57 used in the actuator shown in FIG. 2.

Figure 5:
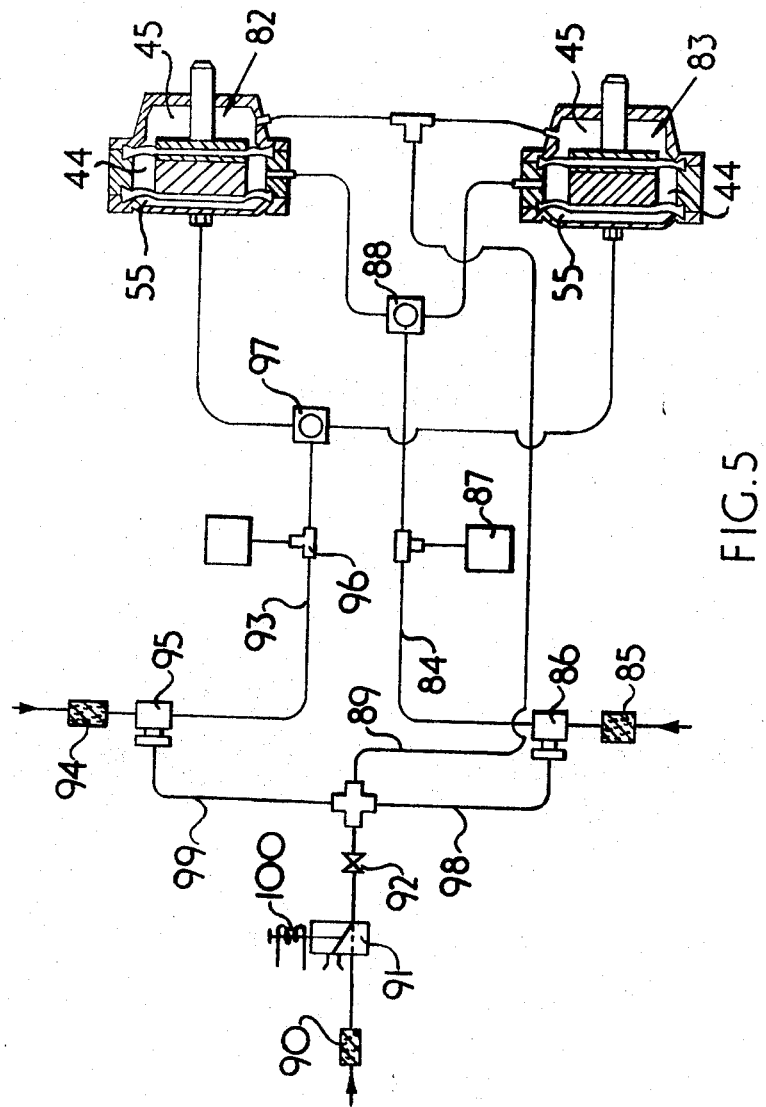
FIG. 5 is a schematic view of a vehicle dual braking system in accordance with the present invention suitable for use with the actuators shown in FIGS. 2, 3 and 4.

A dual braking system in accordance with the present invention for use on the rear wheels of the tractor portion of an articulated vehicle and suitable for use with the actuators shown in FIGS. 2, 3 and 4 is shown in FIG. 5.

FIG. 5 shows a system employing an actuator 82,83 of the form shown in FIG. 2 to operate the brakes of each rear wheel of the vehicle. This system includes sensitivity control valves, exhaust and non-return valves, a variable restrictor, an anti-skid control valve, extra volume tanks, filters and reservoirs identical in construction, operation and purpose to those previously described with reference to FIG. 1. These components will not therefore again be described in detail.

In the system shown in FIG. 5 a service braking function brake-applying line 84 fed from a service braking function reservoir (not shown) includes filter 85, sensitivity control valve 86, extra volume tank 87 and exhaust and non-return valve 88. Service braking function brake-applying line 84 is connected through exhaust and non-return valve 88 to the first working chambers 44 of actuators 82 and 83.

An anti-skid line 89 fed from an anti-skid reservoir (not shown) and including a filter 90, skid control valve 91 and restrictor 92 is connected to the second working chamber 45 of actuators 82 and 83.

A secondary braking function brake-applying line 93 fed from a secondary braking function reservoir (not shown) and including a filter 94, sensitivity control valve 95, extra volume tank 96 and exhaust and non-return valve 97 is connected via valve 97 to the secondary braking function brake-applying chambers 55 of actuators 82 and 83.

The pressure in anti-skid line 89 between restrictor 92 and second working chambers 45 is fed to sensitivity control valves 86 and 95 via lines 98 and 99 respectively in the same manner and for the same purpose that sensitivity control valve 9 is connected to anti-skid line 18 via connecting line 20 in the system shown in FIG. 1.

The service braking function of the system shown in FIG. 5 is controlled by a driver's control valve (not shown) positioned in service braking function line 84 between the service braking function reservoir (not shown) and filter 85. The secondary braking function is controlled by a hand control valve (not shown) positioned in secondary braking function brake-applying line 93 between the secondary braking function reservoir (not shown) and filter 94. The operation of skid control valve 91 is controlled, using a solenoid 100, by a skid-detecting device or system (not shown) as in the system shown in FIG. 1.

The system shown in FIG. 5 functions as follows. During normal braking by service braking function line 84 the flow of air to the first working chambers of actuators 82 and 83 and hence the application of the associated brakes is controlled by the driver's control valve (not shown). When the skid-detecting device or system senses a skid the skid control valve 91 is actuated to connect the anti-skid reservoir to the second working chambers 95 of actuators 82 and 83 to reduce or completely remove the braking effect of the associated brakes to relieve the skid. The sensitivity control valve 86 operates to control the air pressure present in the portion of the service line 84 between sensitivity control valve 86 and the exhaust and non-return valve 88 in the same manner as sensitivity control valve 9 in the system shown in FIG. 1. Likewise, exhaust and non-return valve 88 operates to control the pressure in first working chambers 44 in the same manner as valve 8 controls the pressure present in first working chambers 4 of the system shown in FIG. 1.

The secondary braking function of the system shown in FIG. 5 is brought into operation by movement of the hand control valve (not shown). Movement of the hand control valve connects the secondary braking function reservoir (not shown) to the secondary braking function brake-applying chambers 55 which apply the associated brakes as described above. When the skid detecting device or system senses a skid the skid-control valve 91 is actuated to connect the anti-skid reservoir to the second working chambers 45 of actuators 82 and 83 to relieve the skid as previously described. Sensitivity control valve 95 operates to control the air pressure present in the portion of the secondary braking function brake-applying line 93 between sensitivity control valve 95 and exhaust and non-return valve 97 in the same manner as sensitivity control valve 9 in the system shown in FIG. 1. Likewise, exhaust and non-return valve 97 operates to control the pressure present in secondary braking function brake-applying chambers 55 in the same manner as valve 8 controls the pressure present in first working chambers 4 of the system shown in FIG. 1.

Provision may be made (not shown) in the system shown in FIG. 5 to ensure that the brakes cannot be applied simultaneously by both service and secondary braking functions.

The secondary braking function line 93 may also be arranged to assist the application of the vehicle rear brakes for the purpose of parking in a similar manner to that described with reference to the actuator shown in FIG. 3. The vehicle rear brakes can be arranged to be applied by secondary braking function brake-applying chambers 55 for the purpose of parking and can then be held on by a hand brake ratchet mechanism (not shown).

Actuators of the form shown in FIG. 3 and FIG. 4 can be operated in the system shown in FIG. 5 in place of actuators 82 and 83 by connecting the service, secondary and anti-skid lines of the system to the first working chamber, secondary braking function brake-applying chamber and second working chamber respectively of each replacement actuator.

It has been found that as vehicle secondary braking function brake-applying lines are normally controlled by a light hand control and produce a braking effect proportional to the movement of the hand control, drivers sometimes use the vehicle secondary braking function in preference to the heavier foot-operated service braking function, even when the service function is undamaged. Thus the importance of providing anti-skid control on the vehicle secondary braking function can be appreciated.

It is, of course, equally important for the secondary braking function to be able to halt the vehicle when the service braking function is inoperative without promoting a dangerous skid, giving rise to the risk of "jack-knifing."

The dual braking system described above, which incorporates anti-skid control on both the service and secondary braking functions of the rear wheels of the vehicle, alleviates, at all times, the possibility of the vehicle skidding whether the service or secondary braking function is operative. The secondary braking function with anti-skid control, can also be extended, if desired, to operate on the front wheels of the vehicle.

Although the present invention has been described above with reference to a pneumatically operated dual braking system it will be apreciated by those skilled in the art that the present invention is also equally applicable to other fluid pressure or vacuum operated systems such as hydraulic and combined hydraulic/pneumatic braking systems.

Having now described my invention — what I claim is:

1. A vehicle dual braking system comprising a service braking function brake-applying line comprising a service braking function brake actuator and a secondary braking function brake-applying line comprising a secondary braking function brake actuator, both the service and secondary braking function brake-applying lines being controlled by a skid-control valve operated by a skid-detecting device associated with a wheel of the vehicle, the skid-detecting device being arranged to detect any tendency of the wheel to lock under braking and to operate the skid control valve to release the operative brake actuator whenever any such tendency is detected, the skid-detecting device also being arranged to operate the skid control valve to re-apply the previously operative brake actuator when the tendency for the wheel to lock has been overcome.

2. A system according to claim 1 wherein the skid-control valve is incorporated in an anti-skid line, the anti-skid line being arranged to release the operative brake actuator whenever a tendency to skid is detected by generating a thrust to oppose the thrust of the operative actuator.

3. A system according to claim 1 wherein the service braking function brake actuator comprises a housing including a first pneumatic pressure operated means provided with a source of pneumatic pressure from a service braking function reservoir forming part of the service braking function brake-applying line, the pressure operated means being controlled by a driver operated control valve in the service braking function line and being arranged to exert a brake-applying thrust on the associated brake proportional to the level of pneumatic pressure supplied to the pressure operated means under the control of the driver operated control valve.

4. A system according to claim 3 wherein the pressure operated means comprises a pressure responsive diaphragm clamped at its outer periphery within the housing.

5. A system according to claim 3 wherein the pressure operated means comprises a piston in sealed sliding contact within the housing.

6. A system according to claim 3 wherein an anti-skid reservoir in the anti-skid line is arranged to supply pneumatic pressure under the control of the skid-control valve to act on the first pressure operated means of the service braking function actuator so as to produce a thrust to oppose the thrust of the operative brake actuator whenever a tendency to skid is detected.

7. A system according to claim 5 wherein a pressure responsive diaphragm is provided within the housing and an anti-skid reservoir in the anti-skid line is arranged to supply pneumatic pressure under the control of the skid-control valve to act on the diaphragm so as to produce a thrust to oppose the thrust of the operative brake actuator whenever a tendency to skid is detected.

8. A system according to claim 1 wherein the secondary braking function brake actuator comprises a housing including a second pneumatic pressure operated means provided with a source of pneumatic pressure from a secondary braking function reservoir forming part of the secondary braking function brake-applying line, the second pressure operated means being controlled by a driver operated secondary braking function control valve in the secondary braking function brake-applying line and being arranged to exert a brake-applying thrust on the associated brake proportional to the level of pressure supplied to the second pressure operated means under the control of the driver operated secondary braking function control valve.

9. A system according to claim 8 wherein the secondary braking function brake actuator second pressure operated means comprises a pressure responsive diaphragm clamped at its outer periphery within the housing.

10. A system according to claim 7 wherein the pressure responsive diaphragm is also arranged to act as the secondary braking function brake actuator by arranging a secondary braking function reservoir to supply the diaphragm with pneumatic pressure under the control of a driver operated secondary braking function control valve, the diaphragm being arranged to exert a brake-applying thrust on the associated brake proportional to the level of pressure supplied to the diaphragm under the control of the driver operated secondary braking function control valve.

11. A system according to claim 8 wherein the secondary braking function brake actuator second pressure operated means is arranged to be held in a deflected position against the action of a spring by pneumatic pressure from the secondary braking function reservoir when the secondary braking function is not in use and to be deflected by the spring to operate the associated brake when the pneumatic pressure from the secondary braking function reservoir is reduced by operation of the secondary braking function control valve.

12. A system according to claim 11 wherein operation of the secondary braking function control valve results in an increase in pneumatic pressure in the portions of the secondary braking function brake-applying line adjacent the secondary braking function reservoir, an inverter valve being provided to convert this increase in pressure to a corresponding reduction in pressure thereby allowing operation of the secondary braking function by the spring.

13. A system according to claim 12 wherein a quick exhaust valve is provided in the secondary braking function brake-applying line to quickly reduce the pneumatic pressure holding the second pressure operated means in the deflected position.

14. A system according to claim 13 wherein the second pressure operated means comprises a piston in sealed sliding contact within the housing.

15. A system according to claim 13 wherein the second pressure operated means comprises a pressure responsive diaphragm clamped at its periphery within the housing.

16. A system according to claim 3 including a sensitivity control valve arranged to restrict the flow of air to the first pneumatic pressure operated means by the service braking function brake-applying line when the anti-skid line is operating, and an exhaust and non-return valve arranged in the service braking function brake-applying line between the sensitivity control valve and the first pneumatic pressure operated means and arranged to disconnect the flow of air from the sensitivity control valve to the first pneumatic pressure operated means and to exhaust to atmosphere the pneumatic pressure exerted on the first pneumatic pressure operated means by the service braking function brake-applying line whenever said pressure exceeds the pressure in the service braking function brake-applying line between the sensitivity control valve and the exhaust and non-return valve.

17. A system according to claim 8 including a sensitivity control valve arranged to restrict the flow of air to the second pneumatic pressure operated means by the secondary braking function brake-applying line when the anti-skid line is operating and an exhaust and non-return valve arranged in the secondary braking function brake-applying line between the sensitivity control valve and the second pneumatic pressure operated means and arranged to disconnect the flow of air from the sensitivity control valve to the second pneumatic pressure operated means and exhaust to atmosphere the pneumatic pressure exerted on the second pneumatic pressure operated means by the secondary braking function brake-applying line whenever said pressure exceeds the pressure in the secondary braking function brake-applying line between the sensitivity control valve and the exhaust and non-return valve.

18. A system according to claim 10 including a sensitivity control valve arranged to restrict the flow of air to the pressure responsive diaphragm from the secondary braking function reservoir when the anti-skid line is operating and an exhaust and non-return valve in the secondary braking function brake-applying line between the diaphragm the exhaust and non-return valve arranged to disconnect the flow of air from the sensitivity control valve to the diaphragm and to exhaust to atmosphere the pneumatic pressure exerted on the diaphragm by the secondary braking function brake-applying line whenever said pressure exceeds the pressure in the secondary braking function brake-applying line between the sensitivity control valve and the exhaust and non-return valve.

19. A system according to claim 1 wherein the secondary braking function brake actuator is arranged to be operable to park the vehicle.

20. A system according to claim 1 wherein means are provided to ensure that the service and secondary braking function cannot be applied simultaneously.

* * * * *

UNITED STATES PATENT OFFICE
CERTIFICATE OF CORRECTION

Patent No. 3,759,581                    Dated September 18, 1973

Inventor(s) John Walter Davis

It is certified that error appears in the above-identified patent and that said Letters Patent are hereby corrected as shown below:

Column 4, line 44, delete "to" and insert -- the --.

Column 4, line 68, delete "secondary" and insert -- second --.

Column 6, line 4, delete "operates" and insert -- operate --.

Column 9, line 43, delete "reained" and insert -- retained --.

Column 9, line 43, after "can" insert -- still --.

Column 11, line 52, delete "apreciated" and insert
            -- appreciated --.

Signed and sealed this 30th day of April 1974.

(SEAL)
Attest:

EDWARD M.FLETCHER,JR.                   C. MARSHALL DANN
Attesting Officer                       Commissioner of Patents